(12) United States Patent  (10) Patent No.: US 8,029,761 B2
Fomitchev et al.  (45) Date of Patent: Oct. 4, 2011

(54) SURFACE-TREATED METAL OXIDE PARTICLES

(75) Inventors: Dmitry Fomitchev, Lexington, MA (US); William R. Williams, Reading, MA (US); Casey P. Whicher, Brighton, MA (US); Jincheng Xiong, Boxborough, MA (US)

(73) Assignee: Cabot Corporation, Boston, MA (US)

( * ) Notice: Subject to any disclaimer, the term of this patent is extended or adjusted under 35 U.S.C. 154(b) by 992 days.

(21) Appl. No.: 11/848,350

(22) Filed: Aug. 31, 2007

(65) Prior Publication Data

US 2008/0095698 A1   Apr. 24, 2008

Related U.S. Application Data

(60) Provisional application No. 60/841,826, filed on Sep. 1, 2006.

(51) Int. Cl.
*C01B 13/14* (2006.01)
(52) U.S. Cl. .................. 423/592.1; 423/600; 423/625
(58) Field of Classification Search .............. 423/592.1, 423/600, 625
See application file for complete search history.

(56) References Cited

U.S. PATENT DOCUMENTS

| | | | |
|---|---|---|---|
| 4,902,570 A | 2/1990 | Heinemann et al. |
| 4,943,507 A | 7/1990 | Takahashi et al. |
| 5,139,914 A | 8/1992 | Tomiyama et al. |
| 5,219,696 A | 6/1993 | Demizu et al. |
| 5,244,764 A | 9/1993 | Uno et al. |
| 5,307,122 A | 4/1994 | Ohno et al. |
| 5,350,657 A | 9/1994 | Anno et al. |
| 5,368,639 A | 11/1994 | Hasegawa et al. |
| 5,370,957 A | 12/1994 | Nishikiori et al. |
| 5,384,194 A | 1/1995 | Deusser et al. |
| 5,419,928 A | 5/1995 | Deusser et al. |
| 5,458,681 A | 10/1995 | Hasegawa et al. |
| 5,607,806 A | 3/1997 | Kanbayashi et al. |
| 5,686,054 A | 11/1997 | Barthel et al. |
| 5,707,770 A | 1/1998 | Tanikawa et al. |
| 5,756,788 A | 5/1998 | Mitchnick et al. |
| 5,763,229 A | 6/1998 | Kobayashi et al. |
| 5,824,442 A | 10/1998 | Tanikawa et al. |
| 5,837,414 A | 11/1998 | Kitani et al. |
| 5,843,525 A | 12/1998 | Shibasaki et al. |
| 5,851,715 A | 12/1998 | Barthel et al. |
| 5,981,131 A | 11/1999 | Hirama et al. |
| 6,013,402 A | 1/2000 | Kanbayashi et al. |
| 6,022,404 A | 2/2000 | Ettlinger et al. |
| 6,045,650 A | 4/2000 | Mitchnick et al. |
| 6,066,421 A | 5/2000 | Julien et al. |
| 6,077,640 A | 6/2000 | Komai et al. |
| 6,096,468 A | 8/2000 | Ohno et al. |
| 6,124,071 A | 9/2000 | Lin et al. |
| 6,130,017 A | 10/2000 | Hayashi et al. |
| 6,146,801 A | 11/2000 | Ichikawa et al. |
| 6,214,509 B1 | 4/2001 | Kasuya et al. |
| 6,265,126 B1 | 7/2001 | Nishihara et al. |
| 6,326,116 B2 | 12/2001 | Yuasa et al. |
| 6,376,077 B1 | 4/2002 | Hiraishi et al. |
| 6,465,144 B1 | 10/2002 | Hashimoto et al. |
| 6,503,676 B2 | 1/2003 | Yamashita et al. |
| 6,573,018 B2 | 6/2003 | Ishibashi et al. |
| 6,596,452 B2 | 7/2003 | Magome et al. |
| 6,630,276 B2 | 10/2003 | Sugiura et al. |
| 6,638,674 B2 | 10/2003 | Komoto et al. |
| 6,677,095 B2 | 1/2004 | Murota et al. |
| 6,680,109 B1 | 1/2004 | Plambeck-Fischer et al. |
| 6,696,211 B2 | 2/2004 | Yoshida et al. |
| 6,743,269 B2 | 6/2004 | Meyer et al. |
| 6,780,556 B2 | 8/2004 | Sugiura et al. |
| 6,887,636 B2 | 5/2005 | Matsuda et al. |
| 6,911,289 B2 | 6/2005 | Higuchi et al. |
| 6,972,301 B2 | 12/2005 | Hurlburt et al. |
| 7,014,975 B2 | 3/2006 | Barthel et al. |
| 7,081,234 B1 | 7/2006 | Qi et al. |
| 7,109,256 B2 | 9/2006 | Amano et al. |
| 7,112,393 B2 | 9/2006 | Komoto et al. |
| 7,150,953 B2 | 12/2006 | Yamazaki et al. |
| 7,160,663 B2 | 1/2007 | Komoto et al. |
| 7,238,387 B2 | 7/2007 | Ogawa et al. |
| 2002/0168524 A1 | 11/2002 | Kerner et al. |
| 2004/0038141 A1 | 2/2004 | Yoshida et al. |
| 2004/0038142 A1 | 2/2004 | Yoshida et al. |
| 2004/0047887 A1 | 3/2004 | Kanemaru et al. |
| 2004/0220419 A1 | 11/2004 | Gottschalk-Gaudig et al. |
| 2004/0249019 A1 | 12/2004 | Meyer et al. |
| 2005/0026089 A1 | 2/2005 | Ogawa et al. |
| 2005/0147908 A1 | 7/2005 | Yamane et al. |
| 2005/0175921 A1 | 8/2005 | Morris et al. |

(Continued)

FOREIGN PATENT DOCUMENTS

DE    10-2005-039-436 A1    2/2007
(Continued)

OTHER PUBLICATIONS

Maciel et al. *J. Am. Chem. Soc.*, 102: 7606-7607 (1980).
Sindorf, *Si-29 and C-13 CP/MAS NMR Studies of Silica Gel and Bonded Silane Phases*, (iii-292) (Colorado State University, Fort Collins, CO., Spring, 1982).
Sindorf et al., *J. Phys. Chem.*, 86(26): 5208-5219 (Oct.-Dec. 1982).
Sindorf et al., *J. Am. Chem. Soc.* 105(12): 3767-3776 (1983).

*Primary Examiner* — Edward Johnson

(57) ABSTRACT

The invention provides surface-treated metal oxide particles. The surface-treated metal oxide particles have specific ratios of (1) the integrated area of the resonance signals with chemical shifts in the range from −4 ppm to −33 ppm to the integrated area of the resonance signals with chemical shifts in the range from −33 ppm to −76 ppm and (2) the integrated area of the resonance signals with chemical shifts in the range from −76 ppm to −130 ppm to the integrated area of the resonance signals with chemical shifts in the range from −33 ppm to −76 ppm in the CP/MAS $^{29}$Si NMR spectrum. The invention further provides a toner composition for electrophotographic image formation comprising toner particles and surface-treated metal oxide particles.

24 Claims, 2 Drawing Sheets

U.S. PATENT DOCUMENTS

| | | |
|---|---|---|
| 2005/0203214 A1 | 9/2005 | Amano et al. |
| 2006/0178451 A1 | 8/2006 | Weller |
| 2006/0189740 A1 | 8/2006 | Kamimura et al. |
| 2006/0204528 A1 | 9/2006 | Nolte et al. |
| 2007/0111880 A1 | 5/2007 | Schumacher et al. |

FOREIGN PATENT DOCUMENTS

| | | |
|---|---|---|
| EP | 0 498 942 A1 | 8/1992 |
| EP | 0 522 916 B1 | 1/1993 |
| EP | 0 592 018 B1 | 4/1994 |
| EP | 0 686 676 A1 | 12/1995 |
| EP | 0 722 992 A1 | 7/1996 |
| EP | 0 774 696 B1 | 5/1997 |
| EP | 0 799 791 B1 | 10/1997 |
| EP | 0 860 478 B1 | 8/1998 |
| EP | 0 869 762 B1 | 10/1998 |
| EP | 0 288 693 B1 | 11/1998 |
| EP | 0 949 305 A2 | 10/1999 |
| EP | 0 992 857 B1 | 4/2000 |
| EP | 1 017 746 B1 | 7/2000 |
| EP | 1 083 151 B1 | 3/2001 |
| EP | 1 116 753 A2 | 7/2001 |
| EP | 1 138 724 B1 | 10/2001 |
| EP | 1 150 175 A1 | 10/2001 |
| EP | 1 150 176 A1 | 10/2001 |
| EP | 1 204 006 B1 | 5/2002 |
| EP | 1 236 773 A2 | 9/2002 |
| EP | 1 237 048 A1 | 9/2002 |
| EP | 1 249 475 B1 | 10/2002 |
| EP | 1 304 332 B1 | 4/2003 |
| EP | 1 473 296 B1 | 11/2004 |
| EP | 1 502 933 A2 | 2/2005 |
| EP | 1 690 902 A2 | 8/2006 |
| EP | 1 708 038 A2 | 10/2006 |
| JP | 60-243666 A | 12/1985 |
| JP | 62-227160 A | 10/1987 |
| JP | 62-290773 A | 12/1987 |
| JP | 63-225247 A | 9/1988 |
| JP | 2-109058 A | 4/1990 |
| JP | 4-78433 A | 3/1992 |
| JP | 5-45926 A | 2/1993 |
| JP | 5-281777 A | 10/1993 |
| JP | 5-339518 A | 12/1993 |
| JP | 7-271087 A | 10/1995 |
| JP | 7-330324 A | 12/1995 |
| JP | 8-48910 A | 2/1996 |
| JP | 8-253321 A | 10/1996 |
| JP | 10-90936 A | 4/1998 |
| JP | 10-142833 A | 5/1998 |
| JP | 11-212299 A | 8/1999 |
| JP | 11-322306 A | 11/1999 |
| JP | 11-322329 A | 11/1999 |
| JP | 11-322330 A | 11/1999 |
| JP | 2001-13712 A | 1/2001 |
| JP | 2001-34061 A | 2/2001 |
| JP | 2001-75309 A | 3/2001 |
| JP | 2001-146419 A | 5/2001 |
| JP | 2001-166540 A | 6/2001 |
| JP | 2001-166541 A | 6/2001 |
| JP | 2001-262004 A | 9/2001 |
| JP | 2001-281914 A | 10/2001 |
| JP | 2002-23413 A | 1/2002 |
| JP | 2002-148847 A | 5/2002 |
| JP | 2002-516602 T | 6/2002 |
| JP | 2002-221820 A | 8/2002 |
| JP | 2002-256173 A | 9/2002 |
| JP | 2002-321909 A | 11/2002 |
| JP | 2002-341130 A | 11/2002 |
| JP | 2003-212882 A | 7/2003 |
| JP | 2003-241419 A | 8/2003 |
| JP | 2004-339508 | 12/2004 |
| JP | 2005-22963 A | 1/2005 |
| JP | 2005-60214 A | 3/2005 |
| JP | 2005-107066 A | 4/2005 |
| JP | 2005-298818 A | 10/2005 |
| JP | 2006-290725 A | 10/2006 |
| JP | 2006-526559 T | 11/2006 |
| WO | WO 01/34711 A1 | 5/2001 |
| WO | WO 03/014021 A1 | 2/2003 |
| WO | WO 2004/108595 A2 | 12/2004 |
| WO | WO 2004/110931 A2 | 12/2004 |
| WO | WO 2007/020062 A2 | 2/2007 |

SURFACE-TREATED METAL OXIDE PARTICLES

CROSS-REFERENCE TO RELATED APPLICATIONS

This patent application claims the benefit of U.S. Provisional Patent Application No. 60/841,826, filed Sep. 1, 2006, which is incorporated by reference.

BACKGROUND OF THE INVENTION

Electrophotographic image formation comprises developing an electrostatic latent image formed on a photoreceptor with a toner comprising a colorant dispersed in a binder resin, transferring the toner image to receiving paper, and fixing the transferred toner image by means of, for example, a hot roll. The photoreceptor is cleaned after the transferring step to prepare for next latent image formation.

Metal oxide particles are often combined with toner particles in order to improve selected properties of the toner particles, including fluidity, transferability, fixability, and cleaning properties. Typically, the metal oxide particles, e.g., silica, alumina, or titania, are subjected to a chemical treatment to render the surface of the metal oxide particles hydrophobic.

In addition, the metal oxide particles strongly influence the chargeability, i.e., tribocharge, of the toner composition. Specifically, toner containing silica as an additive exhibits higher absolute levels of tribocharge than toner containing titania, and toner containing titania exhibits higher absolute levels of tribocharge than toner containing alumina.

However, it is known that the tribocharge of toner containing silica depends on the temperature and relative humidity of the environment. Often, the tribocharging of toner formulated with silica is too high at low humidity and too low at high humidity. As a result, silica produces a large difference in chargeability depending on the environmental conditions, which leads to impaired transferability and ultimately reduced image quality. In contrast, the tribocharging of toner formulated with aluminum oxide is often too low under both high and low humidity conditions. While the chemical treatment to render the surface of the metal oxide particles hydrophobic also affects the tribocharge of toner containing silica and aluminum oxide, the chemical treatment generally fails to overcome the deficiencies of the tribocharge properties of the core metal oxide particle.

Thus, a need exists for toner compositions with improved humidity resistance and/or levels of tribocharge. Specifically, a need exists for chemical treatments of metal oxide particles that allow for control of the tribocharge properties and humidity resistance of the metal oxide particle additives in toner.

BRIEF SUMMARY OF THE INVENTION

The invention provides surface-treated metal oxide particles having (1) a ratio D:T of the integrated area of the resonance signals with chemical shifts in the range from −4 ppm to −33 ppm to the integrated area of the resonance signals with chemical shifts in the range from −33 ppm to −76 ppm of 0.10 to 2.50, and (2) a ratio Q:T of the integrated area of the resonance signals with chemical shifts in the range from −76 ppm to −130 ppm to the integrated area of the resonance signals with chemical shifts in the range from −33 ppm to −76 ppm of 0.10 to 2.50 in the cross-polarization magic-angle spinning (CP/MAS) $^{29}$Si NMR spectrum, with the proviso that, when the ratio D:T is 1.16 to 1.29, then the ratio Q:T is not 0.53 to 0.67, wherein the chemical shift in ppm is measured relative to the standard tetramethylsilane.

The invention further provides a toner composition comprising (a) toner particles, and (b) surface-treated metal oxide particles having (1) a ratio D:T of the integrated area of the resonance signals with chemical shifts in the range from −4 ppm to −33 ppm to the integrated area of the resonance signals with chemical shifts in the range from −33 ppm to −76 ppm of 0.10 to 2.50, and (2) a ratio Q:T of the integrated area of the resonance signals with chemical shifts in the range from −76 ppm to −130 ppm to the integrated area of the resonance signals with chemical shifts in the range from −33 ppm to −76 ppm of 0.10 to 2.50 in the cross-polarization magic-angle spinning (CP/MAS) $^{29}$Si NMR spectrum, with the proviso that, when the ratio D:T is 1.16 to 1.29, then the ratio Q:T is not 0.53 to 0.67, wherein the chemical shift in ppm is measured relative to the standard tetramethylsilane.

BRIEF DESCRIPTION OF THE SEVERAL VIEWS OF THE DRAWING(S)

DETAILED DESCRIPTION OF THE INVENTION

Figure 1:
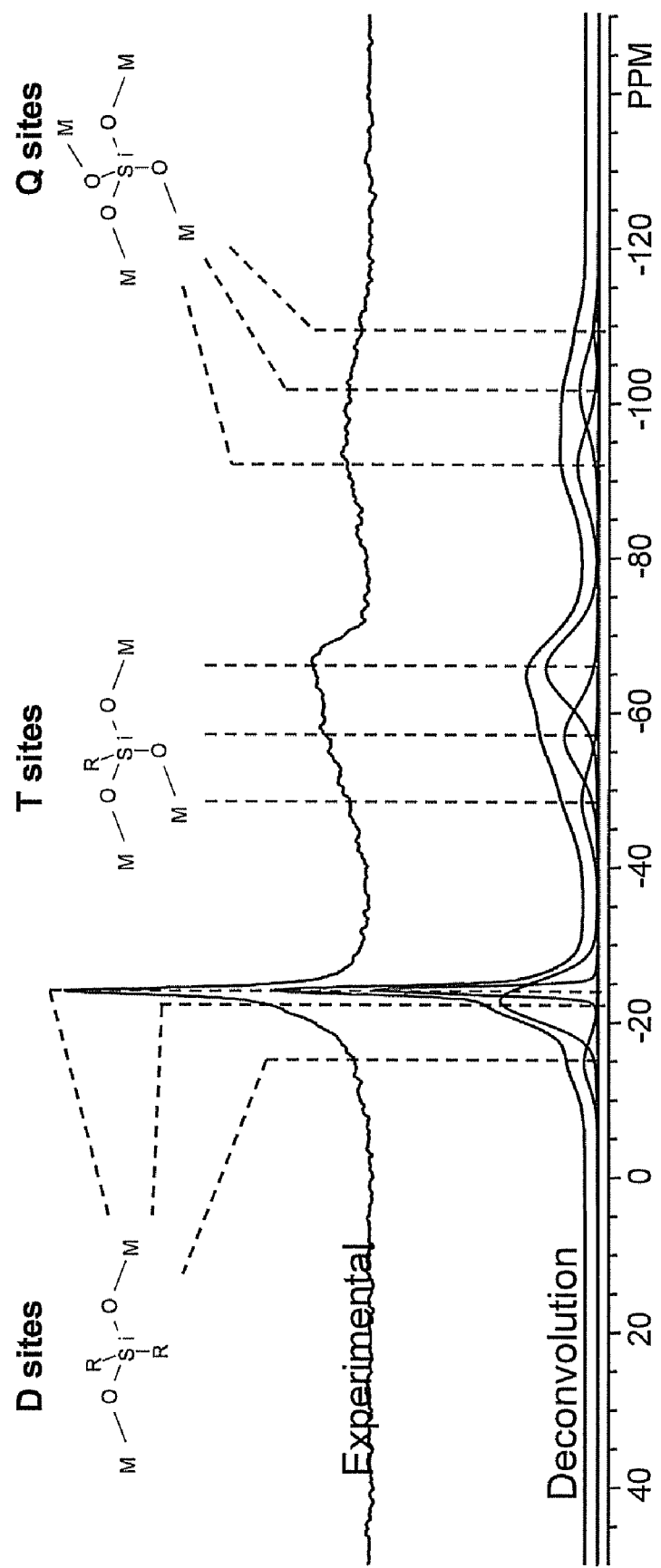
FIG. 1 is a CP MAS $^{29}$Si NMR spectra of surface-treated alumina and its simulation.

The invention provides a toner composition. The toner composition comprises toner particles and surface-treated metal oxide particles. The metal oxide particles have been subjected to a surface treatment step that allows for the control and/or selection of certain properties of the metal oxide particles, including tribocharge.

The toner particles can be any suitable toner particles. Suitable toner particles typically comprise a colorant and a binder resin.

The colorant can be any suitable colorant. A wide range of colored pigments, dyes, or combinations of pigments and dyes can be used as the colorant. The colorant can be blue, brown, black such as carbon black, cyan, green, violet, magenta, red, yellow, as well as mixtures thereof. Suitable classes of colored pigments and dyes include, for example, anthraquinones, phthalocyanine blues, phthalocyanine greens, diazos, monoazos, pyranthrones, perylenes, heterocyclic yellows, quinacridones, and (thio)indigoids. The colorant can be present in any suitable amount, e.g., an amount sufficient to provide the desired color to the toner composition. Generally, the colorant is present in an amount of about 1% by weight to about 30% by weight of the toner composition; however, lesser or greater amounts of the colorant can be utilized.

The binder resin can be any suitable binder resin. Illustrative examples of suitable binder resins include homopolymers and copolymers of polyesters, polyamides, polyolefins, styrene acrylates, styrene methacrylates, styrene butadienes, crosslinked styrene polymers, epoxies, polyurethanes, vinyl resins, including homopolymers or copolymers of two or more vinyl monomers, polyesters, and mixtures thereof. In particular, the binder resin can include (a) homopolymers of styrene and its derivatives and copolymers thereof such as polystyrene, poly-p-chlorostyrene, polyvinyltoluene, styrene p-chlorostyrene copolymer, and styrene vinyltoluene copolymer, (b) copolymers of styrene and acrylic acid ester such as styrenemethyl acrylate copolymer, styrene ethyl acrylate copolymer, styrene-n-butyl acrylate copolymer, and styrene- 2-ethylhexyl acrylate copolymer, (c) copolymers of styrene and methacrylic acid ester such as styrene methyl methacrylate, styrene ethyl methacrylate, styrene n-butyl methacrylate, and styrene 2-ethylhexyl methacrylate, (d) multi-component copolymers of styrene, acrylic acid ester, and methacrylic acid ester, (e) styrene copolymers of styrene with other vinyl monomers such as acrylonitrile, vinyl methyl ether, butadiene, vinyl methyl ketone, acrylonitrile-indene, and maleic acid ester, (f) polymethyl methacrylate, polybutyl methacrylate, polyvinyl acetate, polyvinyl butyral, polyacrylic acid resin, phenolic resin, aliphatic or alicyclic hydrocarbon resin, petroleum resin, and chlorin paraffin, and (g) mixtures thereof. Other types of suitable binder resins are known to those skilled in the art. The binder resin can be present in any suitable amount, typically about 60 wt. % to about 95 wt. % (e.g., about 65 wt. % to about 90 wt. %, or about 70 wt. % or about 85 wt. %) of the toner composition.

The surface-treated metal oxide particles can be present in any suitable amount in the toner composition. The surface-treated metal oxide particles can be present in an amount of about 0.01 wt. % or more (e.g., about 0.05 wt. % or more, about 0.1 wt. % or more, about 0.5 wt. % or more, about 1 wt. % or more, about 2 wt. % or more, about 3 wt. % or more, about 4 wt. % or more, or about 5 wt. % or more) based on the total weight of the toner composition. In addition, the surface-treated metal oxide particles can be present in an amount of about 10 wt. % or less (e.g., about 8 wt. % or less, about 6 wt. % or less, about 5 wt. % or less, or about 4 wt. % or less) based on the total weight of the toner composition. For example, the surface-treated metal oxide particles can be present in an amount of about 0.01 wt. % to about 10 wt. % (e.g., about 0.1 wt. % to about 8 wt. %, or about 0.5 wt. % or about 5 wt. %) based on the total weight of the toner composition.

Optional additives can be present in the toner composition, such as, for example, magnetic material; carrier additives; positive or negative charge controlling agents such as quaternary ammonium salts, pyridinum salts, sulfates, phosphates, and carboxylates; flow aid additives; silicone oils; waxes such as commercially available polypropylenes and polyethylenes; and other known additives. Generally, these additives are present in an amount of about 0.05 wt. % to about 30 wt. % (e.g., about 0.1 wt. % to about 25 wt. %, or about 1 wt. % to about 20 wt. %) of the toner composition; however, lesser or greater amounts of the additives can be utilized depending on the particular system and desired properties.

In a first embodiment, the surface-treated metal oxide particles have (1) a ratio D:T of the integrated area of the resonance signals with chemical shifts in the range from −4 ppm to −33 ppm to the integrated area of the resonance signals with chemical shifts in the range from −33 ppm to −76 ppm of 0.10 to 2.50, and (2) a ratio Q:T of the integrated area of the resonance signals with chemical shifts in the range from −76 ppm to −130 ppm to the integrated area of the resonance signals with chemical shifts in the range from −33 ppm to −76 ppm of 0.10 to 2.50 in the CP/MAS $^{29}$Si NMR spectrum, with the proviso that, when the ratio D:T is 1.16 to 1.29, then the ratio Q:T is not 0.53 to 0.67, wherein the chemical shift in ppm is measured relative to the standard tetramethylsilane. Alternatively, the surface-treated metal oxide particles have a ratio D:T of 0.10 to 1.10 or 1.35 to 2.50, (e.g., 0.10 to 1.05, 1.40 to 2.50, 0.10 to 1.00, or even 1.45 to 2.50). Alternatively, the surface-treated metal oxide particles have a ratio Q:T of 0.10 to 0.50 or 0.70 to 2.50, (e.g., 0.10 to 0.45, 0.75 to 2.50, 0.10 to 0.40, or even 0.80 to 2.50).

In a second embodiment, the surface-treated metal oxide particles have (1) a ratio D:T of the integrated area of the resonance signals with chemical shifts in the range from −4 ppm to −33 ppm to the integrated area of the resonance signals with chemical shifts in the range from −33 ppm to −76 ppm of 0.10 to 1.15, and (2) a ratio Q:T of the integrated area of the resonance signals with chemical shifts in the range from −76 ppm to −130 ppm to the integrated area of the resonance signals with chemical shifts in the range from −33 ppm to −76 ppm of 0.10 to 2.50 in the CP/MAS $^{29}$Si NMR spectrum, wherein the chemical shift in ppm is measured relative to the standard tetramethylsilane. Alternatively, the surface-treated metal oxide particles have a ratio D:T of 0.20 to 1.00, 0.40 to 1.00, 1.00 to 1.15, or 0.60 to 1.00. Alternatively, the surface-treated metal oxide particles have a ratio Q:T between 0.10 to 0.90, 0.10 to 0.70, 0.10 to 0.40, 0.40 to 0.75, or 0.70 to 1.00.

In a third embodiment, the surface-treated metal oxide particles have (1) a ratio D:T of the integrated area of the resonance signals with chemical shifts in the range from −4 ppm to −33 ppm to the integrated area of the resonance signals with chemical shifts in the range from −33 ppm to −76 ppm of 1.30 to 2.50, and (2) a ratio Q:T of the integrated area of the resonance signals with chemical shifts in the range from −76 ppm to −130 ppm to the integrated area of the resonance signals with chemical shifts in the range from −33 ppm to −76 ppm of 0.10 to 2.50 in the CP/MAS $^{29}$Si NMR spectrum, wherein the chemical shift in ppm is measured relative to the standard tetramethylsilane. Alternatively, the surface-treated metal oxide particles have a ratio D:T of 1.30 to 2.00, 1.30 to 1.50, or 1.35 to 1.60. Alternatively, the surface-treated metal oxide particles have a ratio Q:T between 0.10 to 0.50, 0.30 to 0.50, 0.60 to 1.00, or 0.60 to 0.80.

In a fourth embodiment, the surface-treated metal oxide particles have (1) a ratio D:T of the integrated area of the resonance signals with chemical shifts in the range from −4 ppm to −33 ppm to the integrated area of the resonance signals with chemical shifts in the range from −33 ppm to −76 ppm of 0.10 to 2.50, and (2) a ratio Q:T of the integrated area of the resonance signals with chemical shifts in the range from −76 ppm to −130 ppm to the integrated area of the resonance signals with chemical shifts in the range from −33 ppm to −76 ppm of 0.10 to 0.50 in the CP/MAS $^{29}$Si NMR spectrum, wherein the chemical shift in ppm is measured relative to the standard tetramethylsilane. Alternatively, the surface-treated metal oxide particles have a ratio D:T of 0.90 to 2.00 or 1.10 to 1.60. Alternatively, the surface-treated metal oxide particles have a ratio Q:T of 0.30 to 0.50.

In a fifth embodiment, the surface-treated metal oxide particles have (1) a ratio D:T of the integrated area of the resonance signals with chemical shifts in the range from −4 ppm to −33 ppm to the integrated area of the resonance signals with chemical shifts in the range from −33 ppm to −76 ppm of 0.10 to of 2.50, and (2) a ratio Q:T of the integrated area of the resonance signals with chemical shifts in the range from −76 ppm to −130 ppm to the integrated area of the resonance signals with chemical shifts in the range from −33 ppm to −76 ppm of 0.68 to 2.50 in the CP/MAS $^{29}$Si NMR spectrum, wherein the chemical shift in ppm is measured relative to the standard tetramethylsilane. Alternatively, the surface-treated metal oxide particles have a ratio D:T of 0.50 to 2.00 or 1.10 to 1.60. Alternatively, the surface-treated metal oxide particles have a ratio Q:T of 0.75 to 2.00 or 0.80 to 1.50.

In a sixth embodiment, the surface-treated metal oxide particles have an integrated area of the resonance signals with chemical shifts in the range from −4 ppm to −33 ppm of about 5% to about 25%, an integrated area of the resonance signals with chemical shifts in the range from −33 ppm to −76 ppm of about 90% to about 21%, and an integrated area of the resonance signals with chemical shifts in the range from −76 ppm to −130 ppm of about 5% to about 54% in the CP/MAS $^{29}$Si NMR spectrum based on the total integrated area between −4 ppm and −130 ppm, wherein the chemical shift in ppm is measured relative to the standard tetramethylsilane.

In a seventh embodiment, the surface-treated metal oxide particles have an integrated area of the resonance signals with chemical shifts in the range from −4 ppm to −33 ppm of about 54% to about 42%, an integrated area of the resonance signals with chemical shifts in the range from −33 ppm to −76 ppm of about 42% to about 16%, and an integrated area of the resonance signals with chemical shifts in the range from −76 ppm to −130 ppm of about 4% to about 42% in the CP/MAS $^{29}$Si NMR spectrum based on the total integrated area between −4 ppm and −130 ppm, wherein the chemical shift in ppm is measured relative to the standard tetramethylsilane.

In a eighth embodiment, the surface-treated metal oxide particles have an integrated area of the resonance signals with chemical shifts in the range from −4 ppm to −33 ppm of about 5% to about 62%, an integrated area of the resonance signals with chemical shifts in the range from −33 ppm to −76 ppm of about 90% to about 25%, and an integrated area of the resonance signals with chemical shifts in the range from −76 ppm to −130 ppm of about 5% to about 13% in the CP/MAS $^{29}$Si NMR spectrum based on the total integrated area between −4 ppm and −130 ppm, wherein the chemical shift in ppm is measured relative to the standard tetramethylsilane.

In a ninth embodiment, the surface-treated metal oxide particles have an integrated area of the resonance signals with chemical shifts in the range from −4 ppm to −33 ppm of about 5% to about 16%, an integrated area of the resonance signals with chemical shifts in the range from −33 ppm to −76 ppm of about 90% to about 24%, and an integrated area of the resonance signals with chemical shifts in the range from −76 ppm to −130 ppm of about 5% to about 60% in the CP/MAS $^{29}$Si NMR spectrum based on the total integrated area between −4 ppm and −130 ppm, wherein the chemical shift in ppm is measured relative to the standard tetramethylsilane.

The surface-treated metal oxide particles have been chemically treated with an organic silicon compound, thereby generating various patterns of substituted silicon atoms attached to the surface of the metal oxide particle or attached indirectly to the surface of the metal oxide particle. These substitution patterns have been referred to in the literature as D sites, T sites, and Q sites. See, for example, Sindorf, Dean William, "Silicon-29 and carbon-13 CP/MAS NMR Studies of Silica Gel and Bonded Silane Phases," Department of Chemistry, Colorado State University, Fort Collins, Colo., 1982. The correlation of the D sites, T sites, and Q sites to the resonance signals in the CP/MAS $^{29}$Si NMR spectrum is also discussed in Maciel, G., Sindorf, D. W., *J. Am. Chem. Soc.* 102:7607-7608 (1980), Sindorf, D. W., Maciel, G., *J. Phys. Chem.*, 86:5208-5219 (1982), and Sindorf, D. W., Maciel, G., *J. Am. Chem. Soc.*, 105:3767-3776 (1983).

As defined herein, D sites correspond to a silicon atom originating from the organic silicon compound having two bonds to oxygen atoms and two bonds to carbon atoms upon reaction with the surface of the metal oxide particle. D sites are represented by formula (I):

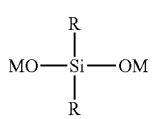

(I)

wherein M is hydrogen, silicon, R, or a metal oxide particle. The R groups are derived from the substituents on the organic silicon compound. The R group can be a substituted or unsubstituted $C_1$-$C_{20}$ alkyl group, an unsubstituted or substituted $C_6$-$C_{18}$ aryl, or an unsubstituted or substituted $C_2$-$C_{20}$ alkenyl. Suitable substituents include, for example, a nitrogen-containing organo group or a halogen, e.g., chloro or fluoro. Preferably, the R group does not contain fluoro substituents. More preferably, the R group is unsubstituted. Si atoms corresponding to D sites have been correlated with the resonance signals with chemical shifts in the range from −4 ppm to −33 ppm in the CP/MAS $^{29}$Si NMR spectrum, wherein the chemical shift in ppm is measured relative to the standard tetramethylsilane.

As defined herein, T sites correspond to a silicon atom originating from the organic silicon compound having three bonds to oxygen and one bond to a carbon atom upon reaction with the surface of the metal oxide particle. While not wishing to be bound by any particular theory, it is hypothesized that T sites can be produced from the decomposition of D sites. The T sites are represented by formula (II):

(II)

wherein M and R are defined as above for formula (I). Si atoms corresponding to T sites have been correlated with the resonance signals with chemical shifts in the range from −33 ppm to −76 ppm in the CP/MAS $^{29}$Si NMR spectrum, wherein the chemical shift in ppm is measured relative to the standard tetramethylsilane.

As defined herein, Q sites correspond to a silicon atom originating from the organic silicon compound having four bonds to oxygen upon reaction with the surface of the metal oxide particle. While not wishing to be bound by any particular theory, it is hypothesized that Q sites can be produced from the decomposition of T sites. The Q sites are represented by formula (III):

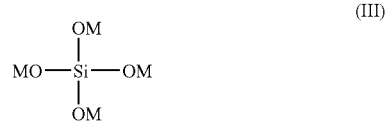

(III)

wherein M is defined as above for formula (I). Si atoms corresponding to Q sites have been correlated with the resonance signals with chemical shifts in the range from −76 ppm to −130 ppm in the CP/MAS $^{29}$Si NMR spectrum, wherein the chemical shift in ppm is measured relative to the standard tetramethylsilane.

The values of the ratio D:T and the ratio Q:T have been found to correlate to tribocharge levels and humidity resistance of the toner. Traditionally, tribocharge is measured in toner exposed to high humidity and high temperature levels, i.e., 30° C. and 80% relative humidity, abbreviated as HH, and low temperature and low humidity levels, i.e., 18° C. and 15% relative humidity, abbreviated as LL. Toner comprising surface-treated metal oxide particles with high values of the ratio Q:T exhibit higher absolute tribocharge levels, i.e., both HH and LL, and toners comprising surface-treated metal oxide particles with lower values of the ratio D:T exhibit higher absolute tribocharge levels, i.e., both HH and LL. However, the magnitude of the effects of the ratio D:T and the ratio Q:T on HH tribocharge and LL tribocharge vary. Thus, by varying the value of the ratio D:T in combination with the value of the ratio Q:T, the properties of the toner, i.e., HH tribocharge, LL tribocharge, and humidity resistance, can be adjusted as necessary for the desired application.

Additionally, the percentage of the area of the resonance peaks in the CP/MAS $^{29}$Si NMR spectrum corresponding to the Q, T, and D sites based on the total integrated area correlate with tribocharge. Thus, the creation of each of Q, T, and D sites on the surface of the metal oxide particle increases absolute tribocharge, but Q sites are most effective at increasing absolute tribocharge, followed by T sites, followed by D sites. Furthermore, the value of the total integrated area of the resonance peaks corresponding to the Q, T, and D sites also correlates with tribocharge. The total area is a reflection of the surface attachment level of the treating agents on the surface of the metal oxide. Therefore, by controlling both the amounts and types of silicon sites on the treated metal oxides, the tribocharge and humidity resistance properties can be tailored for the desired application.

The values of the ratio D:T and the ratio Q:T are influenced by the reaction conditions in the surface treatment step comprising the metal oxide particles and the organic silicon compound. The various conditions affecting the value of the ratios include, for example, the temperature of the treatment step, the atmosphere of the treatment step, the type of metal oxide particles, and the nature and the amount of the organic silicon compound.

The metal oxide particles can be any suitable metal oxide particles. Suitable metal oxide particles include, for example, aluminum oxide, titanium oxide, silica, tin oxide, magnesium oxide, zinc oxide, strontium oxide particles, mixtures thereof, and co-oxides thereof. Preferably, the metal oxide particles are aluminum oxide particles or titanium oxide particles. More preferably, the metal oxide particles are aluminum oxide particles.

The aluminum oxide particles can be any suitable aluminum oxide particles. Preferably, fumed alumina is used in the surface treatment step. The aluminum oxide particles can have any suitable surface area (BET). For example, the aluminum oxide particles can have a surface area of about 55 m$^2$/g or greater, about 80 m$^2$/g or greater, or about 95 m$^2$/g or greater. The aluminum oxide particles can have a surface area of about 200 m$^2$/g or less, about 150 m$^2$/g or less, or about 120 m$^2$/g or less. The aluminum oxide particles can have any suitable primary particle size. For example, the aluminum oxide particles can have a primary particle size of about 15 μm or more, about 20 nm or more, about 25 μm or more, or about 30 nm or more. The aluminum oxide particles can have a primary particles size of about 100 μm or less, about 80 nm or less, or about 50 μm or less. The particle size of a particle is the diameter of the smallest sphere that encompasses the particle. Examples of suitable aluminum oxide particles include fumed alumina SpectrAl™ 51, SpectrAl™ 81, or SpectrAl™ 100, available from Cabot Corporation.

The titanium oxide particles can be any suitable titanium oxide particles. The titanium oxide particles can have any suitable surface area (BET). For example, the titanium oxide particles can have a surface area of about 35 m$^2$/g or greater, about 50 m$^2$/g or greater, about 75 m$^2$/g or greater, or about 90 m$^2$/g or greater. The titanium oxide particles can have a surface area of about 200 m$^2$/g or less, about 150 m$^2$/g or less, or about 120 m$^2$/g or less. The titanium oxide particles can have any suitable primary particle size. For example, the titanium oxide particles can have a primary particle size of about 10 μm or more, about 15 μm or more, about 20 μm or more, or about 30 μm or more. The titanium oxide particles can have a primary particles size of about 100 μm or less, about 80 nm or less, or about 50 μm or less. Examples of suitable titanium oxide particles include Aeroxide™ TiO$_2$ P25, VP TiO$_2$ P90, and Aeroxide™ TiO$_2$ PF 2 titanium oxide, available from Degussa. Alternatively, suitable titanium oxide particles include titanium oxide particles that have been surface-treated with Al$_2$O$_3$, such as TTO-51A and TTO-55B, available from Ishihara Industries.

The organic silicon compound can be any suitable organic silicon compound or combinations of organic silicon compounds. Suitable organic silicon compounds include alkylchlorosilanes, e.g., methyltrichlorosilane, dimethyldichlorosilane, trimethylchlorosilane, phenyltrichlorosilane, diphenyldichlorosilane, octyltrichlorosilane, tert-butyldimethylchlorosilane, and vinyltrichlorosilane; alkylalkoxysilanes, e.g., tetramethoxysilane, methyltrimethoxysilane, dimethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, isobutyltrimethoxysilane, octyltrimethoxysilane, vinyltrimethoxysilane, vinyltriethoxysilane; and silazanes, e.g., hexamethyldisilazane.

Suitable organic silicon compounds also include cyclic polysiloxanes. Cyclic polysiloxanes have repeating units of —O—Si(CH$_3$)$_2$— or —O—SiH(CH$_3$)—. The number of repeating units of —O—Si(CH$_3$)$_2$— or —O—SiH(CH$_3$)— can be any suitable number, e.g., 3 or more, 4 or more, 5 or more, 6 or more, 8 or more, 10 or more, or 20 or more. The number of repeated units of —O—Si(CH$_3$)$_2$— or —O—SiH(CH$_3$)— can be 60 or less, 40 or less, 20 or less, or 10 or less. Preferred cyclic polysiloxanes include, for example, D3, D4, and D5, wherein D3, D4, and D5 have 3, 4, or 5 units of the type —O—Si(CH$_3$)$_2$—, respectively. Most preferably, the cyclic polysiloxane is octamethylcyclotetrasiloxane, e.g., D4.

Alternatively, suitable organic silicon compounds include polysiloxanes. The backbone of the polysiloxane polymer can be substituted with any suitable substituents. Suitable substituents include, for example, C$_{1-10}$ alkyl groups, C$_{6-10}$ aryl groups, epoxy groups, vinyl groups, amino groups, hydride groups, and alkoxy groups. The polysiloxane polymer can be terminated with any suitable group. Suitable groups include, for example, hydroxy groups, vinyl groups, epoxy groups, and hydride groups. Suitable polysiloxanes include, for example, polydimethylsiloxane, polymethylsiloxane, and polyphenylmethylsiloxane, and hydroxy-terminated polydimethylsiloxane.

Any suitable amount of the organic silicon compound can be used in the treatment step. Desirably, about 9 pph or more of the organic silicon compound, e.g., about 18 pph or more, about 27 pph or more, about 35 pph or more, or about 45 pph or more, of the organic silicon compound is used, wherein "pph" represents the parts of the compound per 100 parts of the metal oxide by weight.

The surface treatment reaction mixture can be maintained at any temperature that allows the surface treating agent to react with the metal oxide particles (e.g., to react with the hydroxy groups on the surface of the metal oxide particles). Generally, the reaction mixture is maintained at a temperature of about 25-350° C., such as about 100-315° C., or about 260-300° C., for about 50 minutes or longer (e.g., about 70 minutes or longer), about 100 minutes or longer (e.g., about 120 minutes or longer), about 150 minutes or longer, about 180 minutes or longer), or even about 200 minutes or longer (e.g., about 220 minutes or longer, or about 240 minutes or longer). The surface treatment reaction mixture can be cooled back to room temperature over any suitable length of time. Generally, the reaction mixture can be cooled for about 1 minutes or longer, or about 5 minutes or longer, or even about 30 minutes or longer (e.g., about 40 minutes or longer, about 50 minutes or longer, or about 60 minutes or longer), or even about 70 minutes or longer (e.g., about 80 minutes or longer, about 100 minutes or longer, about 120 minutes or longer, or about 150 minutes or longer).

The surface treatment reaction mixture can be contained in an open or closed reactor. Moreover, the surface treatment step can be carried out in air or nitrogen. Preferably, the surface treatment step is carried out in air. While not wishing to be bound by any particular theory, it is hypothesized that the presence of oxygen facilitates the decomposition of D states to T states as well as the decomposition of T states to Q states. A nitrogen purge can be utilized in order to control the concentration of oxygen in the reactor.

The surface-treated metal oxide particles described herein can be combined with toner particles to provide a toner composition. Any suitable toner particles can be used in accordance with this method, and suitable toner particles are described above with respect to the toner composition of the invention. The method of preparing a toner composition optionally further comprises the addition of other components to the mixture of the toner particles and the surface-treated metal oxide particles described herein.

Conventional equipment for dry blending of powders can be used for mixing or blending the surface-treated metal oxide particles with toner particles to form a toner composition.

The toner composition can be prepared by a number of known methods, such as admixing and heating the surface-treated metal oxide particles, the colorants, the binder resin, and optional charge-enhancing additives and other additives in conventional toner extrusion devices and related equipment. Other methods include spray drying, melt dispersion, extrusion processing, dispersion polymerization, and suspension polymerization, optionally followed by mechanical attrition and classification to provide toner particles having a desired average size and a desired particle size distribution.

The toner composition can be used alone in mono-component developers or can be mixed with suitable dual-component developers. The carrier vehicles which can be used to form developer compositions can be selected from various materials. Such materials typically include carrier core particles and core particles overcoated with a thin layer of film-forming resin to help establish the correct triboelectric relationship and charge level with the toner employed. Suitable carriers for two-component toner compositions include iron powder, glass beads, crystals of inorganic salts, ferrite powder, and nickel powder, all of which are typically coated with a resin coating such as an epoxy or fluorocarbon resin.

The following examples further illustrate the invention but, of course, should not be construed as in any way limiting its scope.

All examples of surface-treated metal oxides were characterized by carbon content and $^{29}$Si NMR. Carbon content was measured using LECO C-200 carbon analyzer.

Solid-state $^{29}$Si cross-polarization magic-angle spinning (CP/MAS) NMR spectra were recorded at 9.4 T (79.49 MHz for $^{29}$Si and 400.19 MHz for $^{1}$H) using a Bruker Avance II-400 spectrometer with a 4-mm double resonance MAS probe. Linear ramp of proton channel RF amplitude from 70% to 100% during the cross-polarization contact time was used for achieving good and stable Hartmann-Hahn matching condition at the magic angle spinning speed of 8 kHz. The $^{29}$Si RF field optimized for the Hartmann-Hahn match is 49 KHz. The contact time for $^{29}$Si CP/MAS measurements were set as 10 ms. Composite pulse proton decoupling (TPPM) with a field strength of 42 kHz was applied during the data acquisition period. Typically, 2000 repeated scans with a recycle delay of 3 seconds were used to acquire the data. All of the NMR measurements were performed at room temperature. The $^{29}$Si chemical shifts are referenced to tetramethylsilane using an external standard of tris(trimethylsilyl)silane.

EXAMPLE 1

850 grams of fumed alumina with a specific surface area of 80 m$^2$/g (SpectrAl™ 81, obtained from Cabot Corporation) was placed in a reactor. The reactor was purged with nitrogen for approximately 1 hour while the alumina was heated and agitated. The reactor was sealed. When the fumed alumina reached an internal temperature of approximately 275° C., 18.42 parts of octamethylcyclotetrasiloxane (D4) per 100 parts of fumed alumina were slowly added to the reactor. The temperature was maintained at 260° C. for 120 minutes, and then allowed to cool to room temperature. The carbon content of the obtained alumina was 2.63 wt %. The ratio D:T was 0.80, and the ratio Q:T was 0.30.

EXAMPLE 2

Fumed alumina with a specific surface area of 95 m$^2$/g (SpectrAl™ 100, obtained from Cabot Corporation) was placed in a reactor. The fumed alumina was sprayed with 34.5 parts of polydimethylsiloxane (PDMS) (Dow Corning 200® Fluid, 50 cSt viscosity, obtained from Dow Corning) per 100 parts of alumina. A stream of air was used to fluidize the material in the reactor while the reactor headspace was purged with nitrogen. The mixture was heated to an internal temperature of approximately 285° C. over approximately 120 minutes and then hot dumped from the reactor. The carbon content of the obtained alumina was 5.95 wt %. The ratio D:T was 1.59, and the ratio Q:T was 0.33.

EXAMPLE 3

800 grams of a mixture of polydimethylsiloxane (PDMS) (Dow Corning 200® Fluid, 50 cSt viscosity, obtained from Dow Corning) and fumed alumina with a specific surface area of 80 m$^2$/g (SpectrAl™ 81, obtained from Cabot Corporation) was placed in a reactor. The mixture contained 9.23 parts of PDMS per 100 parts of fumed alumina. After adding the mixture to the reactor, the reactor was purged with nitrogen. After the nitrogen pre-purge, the fluidization gas was switched to air (21% oxygen) and the mixture was agitated. The mixture of PDMS and alumina was heated to an internal temperature of approximately 300° C. over approximately 70 minutes and then allowed to cool to room temperature. The carbon content of the obtained alumina was 1.70 wt %. The ratio D:T was 1.19, and the ratio Q:T was 0.37.

EXAMPLE 4

850 grams of a mixture of polydimethylsiloxane (PDMS) (Dow Corning 200® Fluid, 50 cSt viscosity, obtained from Dow Corning) and fumed alumina with a specific surface area of 95 m$^2$/g (SpectrAl™ 100, obtained from Cabot Corporation) was placed in a reactor. The mixture contained 34.5 parts of PDMS per 100 parts of fumed alumina. After adding the mixture to the reactor, the reactor was purged with nitrogen.

After the nitrogen pre-purge, the fluidization gas was switched to air (21% oxygen) and the mixture was agitated. The mixture of PDMS and alumina was heated to an internal temperature of approximately 300° C. over approximately 70 minutes and then allowed to cool to room temperature. The carbon content of the obtained alumina was 6.90 wt %. The ratio D:T was 1.36, and the ratio Q:T was 0.43.

EXAMPLE 5

850 grams of a mixture of polydimethylsiloxane (PDMS) (Dow Corning 200® Fluid, 50 cSt viscosity, obtained from Dow Corning) and fumed alumina with a specific surface area of 80 m$^2$/g (SpectrAl™ 81, obtained from Cabot Corporation) was placed in a reactor. The mixture contained 18.46 parts of PDMS per 100 parts of fumed alumina. After adding the mixture to the reactor, the reactor was purged with nitrogen. After the nitrogen pre-purge, the fluidization gas was switched to air (21% oxygen) and the mixture was agitated. The mixture of PDMS and alumina was heated to an internal temperature of approximately 300° C. over approximately 80 minutes and then allowed to cool to room temperature. The carbon content of the obtained alumina was 2.89 wt %. The ratio D:T was 1.32, and the ratio Q:T was 0.47.

EXAMPLE 6

850 grams of a mixture of polydimethylsiloxane (PDMS) (Dow Corning 200® Fluid, 50 cSt viscosity, obtained from Dow Corning) and fumed alumina with a specific surface area of 80 m$^2$/g (SpectrAl™ 81, obtained from Cabot Corporation) was placed in a reactor. The mixture contained 18.46 parts of PDMS per 100 parts of fumed alumina. After adding the mixture to the reactor, the reactor was purged with nitrogen. After the nitrogen pre-purge, the fluidization gas was switched to air (21% oxygen) and the mixture was agitated. The mixture of PDMS and alumina was heated to an internal temperature of approximately 265° C. over approximately 85 minutes and then allowed to cool to room temperature. The carbon content of the obtained alumina was 3.24 wt %. The ratio D:T was 1.03, and the Q:T was 0.51.

COMPARATIVE EXAMPLE 1

850 grams of a mixture of polydimethylsiloxane (PDMS) (Dow Corning 200® Fluid, 50 cSt viscosity, obtained from Dow Corning) and fumed alumina with a specific surface area of 95 m$^2$/g (SpectrAl™ 100, obtained from Cabot Corporation) was placed in a reactor. The mixture contained 34.5 parts of PDMS per 100 parts of fumed alumina. After adding the mixture to the reactor, the reactor was purged with nitrogen. The mixture was agitated under a nitrogen flow. The mixture of PDMS and alumina was heated to an internal temperature of approximately 295° C. over approximately 200 minutes and then hot dumped from the reactor. The carbon content of the obtained alumina was 6.18 wt %. The ratio D:T was 1.28, and the ratio Q:T was 0.54.

COMPARATIVE EXAMPLE 2

850 grams of a mixture of polydimethylsiloxane (PDMS) (Dow Corning 200® Fluid, 50 cSt viscosity, obtained from Dow Corning) and fumed alumina with a specific surface area of 95 m$^2$/g (SpectrAl™ 100, obtained from Cabot Corporation) was placed in a reactor. The mixture contained 34.5 parts of PDMS per 100 parts of fumed alumina. After adding the mixture to the reactor, the reactor was purged with nitrogen. The mixture was agitated under a nitrogen flow. The mixture of PDMS and alumina was heated to an internal temperature of approximately 295° C. over approximately 200 minutes and then allowed to cool to room temperature. The carbon content of the obtained alumina was 6.18 wt %. The ratio D:T was 1.25, and the ratio Q:T was 0.57.

COMPARATIVE EXAMPLE 3

850 grams of a mixture of polydimethylsiloxane (PDMS) (Dow Corning 200® Fluid, 50 cSt viscosity, obtained from Dow Corning) and fumed alumina with a specific surface area of 95 m$^2$/g (SpectrAl™ 100, obtained from Cabot Corporation) was placed in a reactor. The mixture contained 34.5 parts of PDMS per 100 parts of fumed alumina. After adding the mixture to the reactor, the reactor was purged with nitrogen. The mixture was agitated under a nitrogen flow. The mixture of PDMS and alumina was heated to an internal temperature of approximately 295° C. over approximately 110 minutes and then allowed to cool to room temperature. The carbon content of the obtained alumina was 6.18 wt %. The ratio D:T was 1.19, and the ratio Q:T was 0.65.

COMPARATIVE EXAMPLE 4

25 grams of fumed alumina with a specific surface area of 80 m$^2$/g (SpectrAl™ 81, obtained from Cabot Corporation), 2.3 grams of $C_7F_{15}CH_2O(CH_2)_3Si(OC_2H_5)_3$, 0.38 grams of organopolysiloxane (KF-413, 190 cSt viscosity, obtained from Shin-Etsu Corporation), diethylamine, and THF were added to a stainless steel container. The mixture was agitated under a nitrogen flow. The mixture was heated to an internal temperature of approximately 200° C. for approximately 30 minutes and then allowed to cool to room temperature. The resulting product was subjected to $^{29}$Si NMR. While D- and T-type peaks were detected, there were no observable Q-type peaks in the solid-state $^{29}$Si cross-polarization magic-angle spinning (CP/MAS) NMR spectra. Therefore, the Q:T ratio was 0.

COMPARATIVE EXAMPLE 5

20 grams of fumed alumina with a specific surface area of 95 m$^2$/g (SpectrAl™ 100, obtained from Cabot Corporation), 1.8 grams of $C_7F_{15}CH_2O(CH_2)_3Si(OC_2H_5)_3$, 0.5 grams of organopolysiloxane (KF-413, 190 cSt viscosity, obtained from Shin-Etsu Corporation), diethylamine, and THF were added to a stainless steel container. The mixture was agitated under a nitrogen flow. The mixture was heated to an internal temperature of approximately 200° C. for approximately 30 minutes and then allowed to cool to room temperature. The resulting product was subjected to $^{29}$Si NMR. While D- and T-type peaks were detected, there were no observable Q-type peaks in the solid-state $^{29}$Si cross-polarization magic-angle spinning (CP/MAS) NMR spectra. Therefore, the Q:T ratio was 0.

EXAMPLE 7

850 grams of a mixture of polydimethylsiloxane (PDMS) (Dow Corning 200® Fluid, 50 cSt viscosity, obtained from Dow Corning) and fumed alumina with a specific surface area of 95 m$^2$/g (SpectrAl™ 100, obtained from Cabot Corporation) was placed in a reactor. The mixture contained 34.5 parts of PDMS per 100 parts of fumed alumina. After adding the mixture to the reactor, the reactor was purged with nitrogen. After the nitrogen pre-purge, the fluidization gas was switched to air (21% oxygen) and the mixture was agitated. The mixture of PDMS and alumina was heated to an internal temperature of approximately 290° C. over approximately 200 minutes and then hot dumped from the reactor. The carbon content of the obtained alumina was 5.24 wt %. The ratio D:T was 1.43, and the ratio Q:T was 0.67.

EXAMPLE 8

850 grams of a mixture of polydimethylsiloxane (PDMS) (Dow Corning 200® Fluid, 50 cSt viscosity, obtained from Dow Corning) and fumed alumina with a specific surface area of 95 m$^2$/g (SpectrAl™ 100, obtained from Cabot Corporation) was placed in a reactor. The mixture contained 34.5 parts of PDMS per 100 parts of fumed alumina. After adding the mixture to the reactor, the reactor was purged with nitrogen. After the nitrogen pre-purge, the fluidization gas was switched to air (21% oxygen) and the mixture was agitated. The mixture of PDMS and alumina was heated to an internal temperature of approximately 300° C. over approximately 200 minutes and then allowed to cool to room temperature. The carbon content of the obtained alumina was 4.81 wt %. The ratio D:T was 1.10, and the ratio Q:T was 0.68.

EXAMPLE 9

850 grams of a mixture of polydimethylsiloxane (PDMS) (Dow Corning 200® Fluid, 50 cSt viscosity, obtained from Dow Corning) and fumed alumina with a specific surface area of 95 m$^2$/g (SpectrAl™ 100, obtained from Cabot Corporation) was placed in a reactor. The mixture contained 34.5 parts of PDMS per 100 parts of fumed alumina. After adding the mixture to the reactor, the reactor was purged with nitrogen and sealed. The mixture of PDMS and alumina was agitated and heated to an internal temperature of approximately 295° C. over approximately 110 minutes and then allowed to cool to room temperature. The carbon content of the obtained alumina was 5.51 wt %. The ratio D:T was 0.75, and the ratio Q:T was 0.92.

EXAMPLE 10

850 grams of a mixture of polydimethylsiloxane (PDMS) (Dow Corning 200® Fluid, 50 cSt viscosity, obtained from Dow Corning) and fumed alumina with a specific surface area of 50 m$^2$/g (SpectrAl™ 50, obtained from Cabot Corporation) was placed in a reactor. The mixture contained 19 parts of PDMS per 100 parts of fumed alumina. After adding the mixture to the reactor, the reactor was purged with nitrogen. After the nitrogen pre-purge, the fluidization gas was switched to air (21% oxygen) and the mixture was agitated. The mixture of PDMS and alumina was heated to an internal temperature of approximately 300° C. over approximately 115 minutes and then allowed to cool to room temperature. The carbon content of the obtained alumina was 3.30 wt %.

EXAMPLE 11

850 grams of a mixture of silanol terminated polydimethylsiloxane (PDMS-OH) (Dow Corning Fluid Q1-3563, 55-90 cSt viscosity, obtained from Dow Corning) and fumed alumina with a specific surface area of 80 m$^2$/g (SpectrAl™ 81, obtained from Cabot Corporation) was placed in a reactor. The mixture contained 19.25 parts of PDMS per 100 parts of fumed alumina. After adding the mixture to the reactor, the reactor was purged with nitrogen for the entire time of the reaction, and the mixture was agitated. The mixture of PDMS and alumina was heated to an internal temperature of approximately 300° C. over approximately 200 minutes and then allowed to cool to room temperature. The carbon content of the obtained alumina was 2.40 wt %. The ratio D:T was 0.95, and the ratio Q:T was 0.86.

EXAMPLE 12

850 grams of a mixture of silanol terminated polydimethylsiloxane (PDMS-OH) (Gelest product code DMS-S12, 16-32 cSt viscosity, obtained from Gelest) and fumed alumina with a specific surface area of 80 m$^2$/g (SpectrAl™ 81, obtained from Cabot Corporation) was placed in a reactor. The mixture contained 19.25 parts of PDMS per 100 parts of fumed alumina. After adding the mixture to the reactor, the reactor was purged with nitrogen for the entire time of the reaction, and the mixture was agitated. The mixture of PDMS and alumina was heated to an internal temperature of approximately 300° C. over approximately 200 minutes and then allowed to cool to room temperature. The carbon content of the obtained alumina was 1.34 wt %. The ratio D:T was 0.65, and the ratio Q:T was 0.78.

DISCUSSION OF EXAMPLES 1-12 AND COMPARATIVE EXAMPLES 1-5

The various parameters and reaction conditions utilized in Examples 1-12 and Comparative Examples 1-5 are summarized in Table 1.

TABLE 1

| Example | Surface area of Aluminum Oxide Particles (m$^2$/g) | Organic Silicon Compound Treating Agent | Loading of Treating Agent (pph) | Fluidization Gas | Maximum Temperature (° C.) |
|---|---|---|---|---|---|
| Example 1 | 80 | D4 | 18.42 | Nitrogen (sealed reactor) | 315 |
| Example 2 | 95 | PDMS | 34.5 | Air | 285 |
| Example 3 | 80 | PDMS | 9.23 | Air | 300 |
| Example 4 | 95 | PDMS | 34.5 | Air | 300 |
| Example 5 | 80 | PDMS | 18.46 | Air | 300 |
| Example 6 | 80 | PDMS | 18.46 | Air | 265 |
| Comparative Example 1 | 95 | PDMS | 34.5 | Nitrogen | 295 |
| Comparative Example 2 | 95 | PDMS | 34.5 | Nitrogen | 295 |

TABLE 1-continued

| Example | Surface area of Aluminum Oxide Particles (m²/g) | Organic Silicon Compound Treating Agent | Loading of Treating Agent (pph) | Fluidization Gas | Maximum Temperature (°C.) |
|---|---|---|---|---|---|
| Comparative Example 3 | 95 | PDMS | 34.5 | Nitrogen | 295 |
| Comparative Example 4 | 80 | $C_7F_{15}CH_2O(CH_2)_3Si(OC_2H_5)_3$ and organopolysiloxane | 10.7 | Nitrogen | 200 |
| Comparative Example 5 | 95 | $C_7F_{15}CH_2O(CH_2)_3Si(OC_2H_5)_3$ and organopolysiloxane | 11.5 | Nitrogen | 200 |
| Example 7 | 95 | PDMS | 34.5 | Air | 290 |
| Example 8 | 95 | PDMS | 34.5 | Air | 300 |
| Example 9 | 95 | PDMS | 34.5 | Nitrogen (sealed) | 295 |
| Example 10 | 50 | PDMS | 19 | Air | 300 |
| Example 11 | 80 | PDMS-OH | 19.25 | Nitrogen | 300 |
| Example 12 | 80 | PDMS-OH | 19.25 | Nitrogen | 300 |

EXAMPLE 13

Pulverized polyester toner particles were mixed with 1.5 wt. % of the surface-treated alumina of Example 1 to form a toner composition. A developer was prepared by mixing 2 wt. % of the toner composition with 98 wt. % of Cu—Zn ferrite carrier (obtained from PowderTech Co.) coated with silicone resin.

EXAMPLE 14

A developer was prepared in the same manner as in Example 13 except for using the surface-treated alumina of Example 2 in place of the surface-treated alumina of Example 1.

EXAMPLE 15

A developer was prepared in the same manner as in Example 13 except for using the surface-treated alumina of Example 3 in place of the surface-treated alumina of Example 1.

EXAMPLE 16

A developer was prepared in the same manner as in Example 13 except for using the surface-treated alumina of Example 4 in place of the surface-treated alumina of Example 1.

EXAMPLE 17

A developer was prepared in the same manner as in Example 13 except for using the surface-treated alumina of Example 5 in place of the surface-treated alumina of Example 1.

EXAMPLE 18

A developer was prepared in the same manner as in Example 13 except for using the surface-treated alumina of Example 6 in place of the surface-treated alumina of Example 1.

EXAMPLE 19

A developer was prepared in the same manner as in Example 13 except for using the surface-treated alumina of Example 7 in place of the surface-treated alumina of Example 1.

EXAMPLE 20

A developer was prepared in the same manner as in Example 13, except for using the surface-treated alumina of Example 8 in place of the surface-treated alumina of Example 1.

EXAMPLE 21

A developer was prepared in the same manner as in Example 13, except for using the surface-treated alumina of Example 9 in place of the surface-treated alumina of Example 1.

EXAMPLE 22

A developer was prepared in the same manner as in Example 13, except for using the surface-treated alumina of Example 10 in place of the surface-treated alumina of Example 1.

EXAMPLE 23

A developer was prepared in the same manner as in Example 13, except for using the surface-treated alumina of Example 11 in place of the surface-treated alumina of Example 1.

COMPARATIVE EXAMPLE 6

A developer was prepared in the same manner as in Example 13, except for using the surface-treated alumina of Comparative Example 1 in place of the surface-treated alumina of Example 1.

COMPARATIVE EXAMPLE 7

A developer was prepared in the same manner as in Example 13, except for using the surface-treated alumina of Comparative Example 2 in place of the surface-treated alumina of Example 1.

COMPARATIVE EXAMPLE 8

A developer was prepared in the same manner as in Example 13, except for using the surface-treated alumina of Comparative Example 3 in place of the surface-treated alumina of Example 1.

DISCUSSION OF EXAMPLES 13-23 AND COMPARATIVE EXAMPLES 6-8

The developers of Examples 13-23 and Comparative Example 6-8 were exposed to high temperature (30° C.) and high humidity (80% relative humidity) conditions, abbreviated as HH, and low temperature (18° C.) and low humidity (15% relative humidity) conditions, abbreviated as LL. The developers then were charged by rolling them in glass jars for 0.5 to 2 hours. Tribocharge measurements were determined by the blow-off method using a Vertex T-150 instrument.

The tribocharge measurements, the ratio D:T, and the ratio Q:T are set forth in Table 2.

TABLE 2

| Example | Carbon Content of Treated Aluminum Oxide (wt %) | D/T of Treated Aluminum Oxide | Q/T of Treated Aluminum Oxide | HH ($\mu$C/g) | LL ($\mu$C/g) | HH/LL |
|---|---|---|---|---|---|---|
| Example 13 | 2.63 | 0.80 | 0.30 | −22 | −44 | 0.52 |
| Example 14 | 5.95 | 1.59 | 0.33 | −18 | −34 | 0.53 |
| Example 15 | 1.7 | 1.19 | 0.37 | −26 | −39 | 0.68 |
| Example 16 | 6.9 | 1.36 | 0.43 | −22 | −38 | 0.58 |
| Example 17 | 2.89 | 1.32 | 0.47 | −27 | −47 | 0.58 |
| Example 18 | 3.24 | 1.03 | 0.51 | −27 | −47 | 0.57 |
| Comparative Example 6 | 6.18 | 1.28 | 0.54 | −28 | −38 | 0.73 |
| Comparative Example 7 | 6.18 | 1.25 | 0.57 | −31 | −43 | 0.72 |
| Comparative Example 8 | 6.18 | 1.19 | 0.65 | −28 | −47 | 0.6 |
| Example 19 | 5.24 | 1.43 | 0.67 | −33 | −48 | 0.68 |
| Example 20 | 4.81 | 1.10 | 0.68 | −32 | −48 | 0.67 |
| Example 21 | 5.51 | 0.75 | 0.92 | −34 | −54 | 0.64 |
| Example 22 | 3.3 | — | — | −24 | −50 | 0.48 |
| Example 23 | 2.4 | 0.95 | 0.86 | −27 | −54 | 0.5 |

Figure 2:
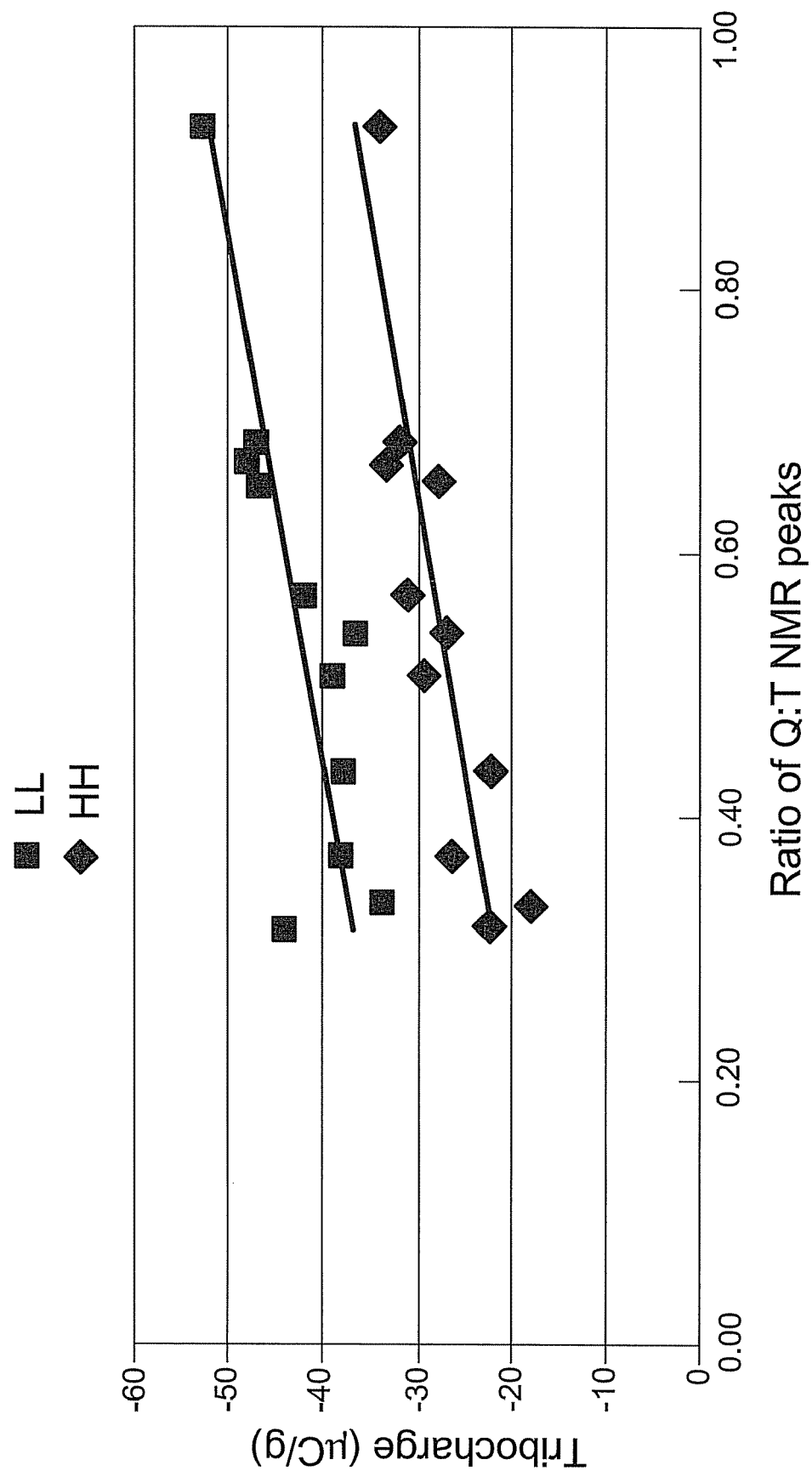
FIG. 2 is a graph of the tribocharge levels of toner comprising surface-treated aluminum oxide particles as a function of the ratio Q:T of the treated aluminum oxide particles.

The data of Table 2 is plotted in the graph of the FIG. 2 which depicts the relationship between the ratio Q:T and tribocharge levels. The graph demonstrates the existence of a linear relationship between tribocharge and the ratio Q:T. Thus, by altering the ratio Q:T, the tribocharge of the toner can be controlled, thereby allowing for the selection of metal oxides with the appropriate level of tribocharging for a particular toner application.

The tribocharge measurements, the integrated area of the resonance signals correlating to the D, T, and Q sites, and the total integrated area of the resonance signals correlating to the D, T, and Q sites are set forth in Table 3.

TABLE 3

| Example | Integrated Area D/100000 | Integrated Area T/100000 | Integrated Area Q/100000 | Total Integrated Area/100000 | HH ($\mu$C/g) | LL ($\mu$C/g) | HH/LL |
|---|---|---|---|---|---|---|---|
| Example 13 | 6.66 | 8.36 | 2.54 | 17.6 | −22 | −44 | 0.52 |
| Example 14 | 7.57 | 4.75 | 1.59 | 13.9 | −18 | −34 | 0.53 |
| Example 15 | 9.33 | 7.87 | 2.9 | 20.1 | −26 | −39 | 0.68 |
| Example 16 | 10.27 | 7.53 | 3.26 | 21.0 | −22 | −38 | 0.58 |
| Example 17 | 10.16 | 7.68 | 3.6 | 21.4 | −27 | −47 | 0.58 |
| Example 18 | 9.43 | 9.13 | 4.62 | 23.2 | −27 | −47 | 0.57 |
| Comparative Example 6 | 9.46 | 7.38 | 3.98 | 20.8 | −28 | −38 | 0.73 |
| Comparative Example 7 | 10.1 | 8.09 | 4.58 | 22.8 | −31 | −43 | 0.72 |
| Comparative Example 8 | 10.36 | 8.72 | 5.71 | 24.8 | −28 | −47 | 0.6 |
| Example 19 | 13.98 | 9.77 | 6.54 | 30.3 | −33 | −48 | 0.68 |
| Example 20 | 13.08 | 11.93 | 8.15 | 33.2 | −32 | −48 | 0.67 |
| Example 21 | 11.41 | 15.13 | 13.98 | 40.5 | −34 | −54 | 0.64 |
| Example 22 | — | — | — | — | −24 | −50 | 0.48 |
| Example 23 | — | — | — | — | −27 | −54 | 0.5 |

The data in Table 3 demonstrate the tribocharging properties that result by altering the percentage of the integrated area of the resonance signals correlating to the D, T, and Q sites and the total integrated area of the resonance signals correlating to the D, T, and Q sites. For example, using Comparative Example 8 as a baseline, unique tribocharing properties are generated by increasing the total area of D, T, and Q by 20%, 30%, 40%, or 50% above the total area of Comparative Example 8. Alternately, unique tribocharing properties are generated by decreasing the total area of D, T, and Q by 20%, 30%, 40%, or 50% below the total area of Comparative Example 8.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Surface-treated metal oxide particles comprising metal oxide particles selected from the group consisting of aluminum oxide particles and titanium oxide particles, surface-treated with an organic silicon compound such that chemical groups containing silicon atoms are attached to the surface of the metal oxide particles,
    wherein the chemical groups containing silicon atoms generate resonance signals with chemical shifts in a CP/MAS $^{29}$Si NMR spectrum,
    wherein the chemical shifts are measured in ppm relative to tetramethylsilane standard,
    wherein resonance signals with chemical shifts in the range from −4 ppm to −33 ppm in the CP/MAS $^{29}$Si NMR spectrum correspond to D sites and have an integrated area on the CP/MAS $^{29}$Si NMR spectrum,
    wherein resonance signals with chemical shifts in the range from −33 ppm to −76 ppm in the CP/MAS $^{29}$Si NMR spectrum correspond to T sites and have an integrated area on the CP/MAS $^{29}$Si NMR spectrum,
    wherein resonance signals with chemical shifts in the range from −76 ppm to −130 ppm in the CP/MAS $^{29}$Si NMR spectrum correspond to Q sites and have an integrated area on the CP/MAS $^{29}$Si NMR spectrum, and
    wherein the surface-treated metal oxide particles have (1) a ratio D:T of the integrated area of the resonance signals with chemical shifts in the range from −4 ppm to −33 ppm to the integrated area of the resonance signals with chemical shifts in the range from −33 ppm to −76 ppm between 0.10 to 2.50, and (2) a ratio Q:T of the integrated area of the resonance signals with chemical shifts in the range from −76 ppm to −130 ppm to the integrated area of the resonance signals with chemical shifts in the range from −33 ppm to −76 ppm between 0.10 to 2.50 in the CP/MAS $^{29}$Si NMR spectrum, with the proviso that, when the ratio D:T is 1.16 to 1.29, then the ratio Q:T is not 0.53 to 0.67.

2. The surface-treated metal oxide particles of claim 1, wherein the ratio D:T is 0.10 to 1.15, and the ratio Q:T is 0.10 to 2.50.

3. The surface-treated metal oxide particles of claim 2, wherein the ratio D:T is 0.20 to 1.00, and the ratio Q:T is 0.10 to 0.70.

4. The surface-treated metal oxide particles of claim 3, wherein the ratio D:T is 0.40 to 1.00, and the ratio Q:T is 0.10 to 0.40.

5. The surface-treated metal oxide particles of claim 2, wherein the ratio D:T is 1.00 to 1.15, and the ratio Q:T is 0.40 to 0.75.

6. The surface-treated metal oxide particles of claim 2, wherein the ratio D:T is 0.6 to 1.00, and the ratio Q:T is 0.70 to 1.00.

7. The surface-treated metal oxide particles of claim 1, wherein the ratio D:T is 1.30 to 2.50, and the ratio Q:T is 0.10 to 2.50.

8. The surface-treated metal oxide particles of claim 7, wherein the ratio D:T is 1.30 to 1.50, and the ratio Q:T is 0.30 to 0.50.

9. The surface-treated metal oxide particles of claim 7, wherein the ratio D:T sites is 1.35 to 1.60, and the ratio Q:T is 0.60 to 0.80.

10. The surface-treated metal oxide particles of claim 1, wherein the ratio D:T is 0.10 to 2.50, and the ratio Q:T is 0.10 to 0.50.

11. The surface-treated metal oxide particles of claim 10, wherein the ratio D:T is 1.10 to 1.60, and the ratio Q:T is 0.30 to 0.50.

12. The surface-treated metal oxide particles of claim 1, wherein the ratio D:T is 0.10 to 2.50, and the ratio Q:T is 0.68 to 2.50.

13. The surface-treated metal oxide particles of claim 1, wherein the metal oxide particles are titanium oxide particles.

14. The surface-treated metal oxide particles of claim 1, wherein the metal oxide particles are aluminum oxide particles.

15. The surface-treated metal oxide particles of claim 1, wherein the surface-treated metal oxide particles are prepared by treating a metal oxide with an organic silicon compound selected from the group consisting of substituted or unsubstituted chloroalkylsilanes, chloroarylsilanes, chlorovinylsilanes, alkoxyalkylsilanes, alkoxyarylsilanes, alkoxyvinylsilanes, and silazanes.

16. The surface-treated metal oxide particles of claim 1, wherein the organic silicon compound is a substituted or unsubstituted polysiloxane.

17. The surface-treated metal oxide particles of claim 16, wherein the polysiloxane is polydimethysiloxane.

18. The surface-treated metal oxide particles of claim 16, wherein the polysiloxane is silanol terminated polydimethysiloxane.

19. The surface-treated metal oxide particles of claim 1, wherein the organic silicon compound is a substituted or unsubstituted cyclic polysiloxane.

20. The surface-treated metal oxide particles of claim 19, wherein the cyclic polysiloxane is octamethylcyclotetrasiloxane.

21. A toner composition comprising:
(a) toner particles, and
(b) surface-treated metal oxide particles comprising metal oxide particles selected from the group consisting of aluminum oxide particles and titanium oxide particles, surface-treated with an organic silicon compound such that chemical groups containing silicon atoms are attached to the surface of the metal oxide particles,
wherein the chemical groups containing silicon atoms generate resonance signals with chemical shifts in a CP/MAS $^{29}$Si NMR spectrum,
wherein the chemical shifts are measured in ppm relative to tetramethylsilane standard,
wherein resonance signals with chemical shifts in the range from −4 ppm to −33 ppm in the CP/MAS $^{29}$Si NMR spectrum correspond to D sites and have an integrated area on the CP/MAS $^{29}$Si NMR spectrum,
wherein resonance signals with chemical shifts in the range from −33 ppm to −76 ppm in the CP/MAS $^{29}$Si NMR spectrum correspond to T sites and have an integrated area on the CP/MAS $^{29}$Si NMR spectrum,
wherein resonance signals with chemical shifts in the range from −76 ppm to −130 ppm in the CP/MAS $^{29}$Si NMR spectrum correspond to Q sites and have an integrated area on the CP/MAS $^{29}$Si NMR spectrum, and
wherein the surface-treated metal oxide particles have (1) a ratio D:T of the integrated area of the resonance signals with chemical shifts in the range from −4 ppm to −33 ppm to the integrated area of the resonance signals with chemical shifts in the range from −33 ppm to −76 ppm between 0.10 to 2.50, and (2) a ratio Q:T of the integrated area of the resonance signals with chemical shifts in the range from −76 ppm to −130 ppm to the integrated area of the resonance signals with chemical shifts in the range from −33 ppm to −76 ppm between 0.10 to 2.50 in the CP/MAS $^{29}$Si NMR spectrum, with the proviso that, when the ratio D:T is 1.16 to 1.29, then the ratio Q:T is not 0.53 to 0.67.

22. The toner composition of claim 21, wherein the toner particles comprise at least one resin selected from the group consisting of acrylic resins, styrene resins, polyester resins, and mixtures thereof.

23. The toner composition of claim 21, wherein the toner particles comprise a styrene-acrylic copolymer resin or a polyester resin.

24. The toner composition of claim 21, wherein the toner composition comprises from about 95 to about 99.9 weight percent of the toner particles and from about 0.1 to about 5 weight percent of the surface-treated metal oxide powder, based on the weight of the toner composition.

* * * * *